United States Patent [19]

Lauritzen et al.

[11] Patent Number: 5,407,223
[45] Date of Patent: Apr. 18, 1995

[54] SLIDE-TOGETHER AIRBAG MODULE

[75] Inventors: Donald R. Lauritzen, Hyrum; Joseph L. Ralston, North Ogden; Larry D. Rose, Layton, all of Utah

[73] Assignee: Morton International, Inc., Chicago, Ill.

[21] Appl. No.: 191,952

[22] Filed: Feb. 4, 1994

[51] Int. Cl.⁶ ............................................. B60R 21/16
[52] U.S. Cl. ............................. 280/728 A; 280/732; 280/743 R
[58] Field of Search ............... 280/728 R, 728 A, 732, 280/741, 743 R

[56] References Cited

U.S. PATENT DOCUMENTS

| | | | |
|---|---|---|---|
| 5,058,919 | 10/1991 | Paquette et al. | 280/728 A X |
| 5,069,480 | 12/1991 | Good | 280/728 A X |
| 5,263,739 | 11/1993 | Webber et al. | 280/732 X |

FOREIGN PATENT DOCUMENTS 0529304 3/1943 European Pat. Off. ........ 280/728 A

Primary Examiner—Margaret A. Focarino
Assistant Examiner—Christopher P. Ellis
Attorney, Agent, or Firm—George W. Rauchfuss, Jr.; Gerald K. White

[57] ABSTRACT

The reaction canister of an airbag module assembly is extruded to include a floor bounded by a pair of channels extending along its length. An inflator chamber is suspended beneath the floor of the canister by rails which are integral with the chamber and slide into the channels.

11 Claims, 3 Drawing Sheets

SLIDE-TOGETHER AIRBAG MODULE

TECHNICAL FIELD

This invention relates to automotive airbag modules. More particularly, it relates to the assembly of the reaction canister and inflator chamber of such a module.

BACKGROUND ART

The automotive airbag is now fully accepted as a life saving element in automotive vehicles. Engineers and designers are striving to provide smaller and smaller module assemblies, particularly passenger side modules. Driver's side modules are already constrained by their position within the steering wheel and the need for protecting only one person.

Passenger side modules are typically rectangular in order to house a larger bag capable of protecting either two passengers or one passenger out of an ideal position. Inflators have developed at a faster pace than have reaction canisters and airbags. As a result, the inflators are normally substantially shorter than the reaction canisters. This has resulted in a number of problems in assembling the components and, to date, there have been no truly satisfactory solutions. Those that have been employed usually result in awkward assembly and increased weight and expense. They include, for example, inflator extensions or cups for centering the inflator. Other solutions involve cutting holes in the canister to receive the inflator. This involves a secondary operation and often requires the plugging of holes and the addition of parts for retaining the inflator.

Accordingly, it is a primary object of the present invention to provide an airbag module assembly wherein a relatively short inflator chamber may be easily secured to a longer reaction canister by a simple sliding fit. Other objects, features, and advantages will become apparent from the following description and appended claims.

DISCLOSURE OF INVENTION

The invention comprises a passenger side airbag module assembly. The reaction canister includes an extruded trough having sidewalls and a floor. The bottom edges of the sidewalls define a pair of cylindrical channels. An extruded cylindrical inflator chamber carries rails which are insertable into the channels in the canister. Base end plates close the ends of the inflator chamber and form a plenum chamber. Openings in the inflator chamber and the floor of the reaction canister permit the passage of gas into an airbag contained within the reaction canister.

BEST MODE FOR CARRYING OUT THE INVENTION

Figure 1:
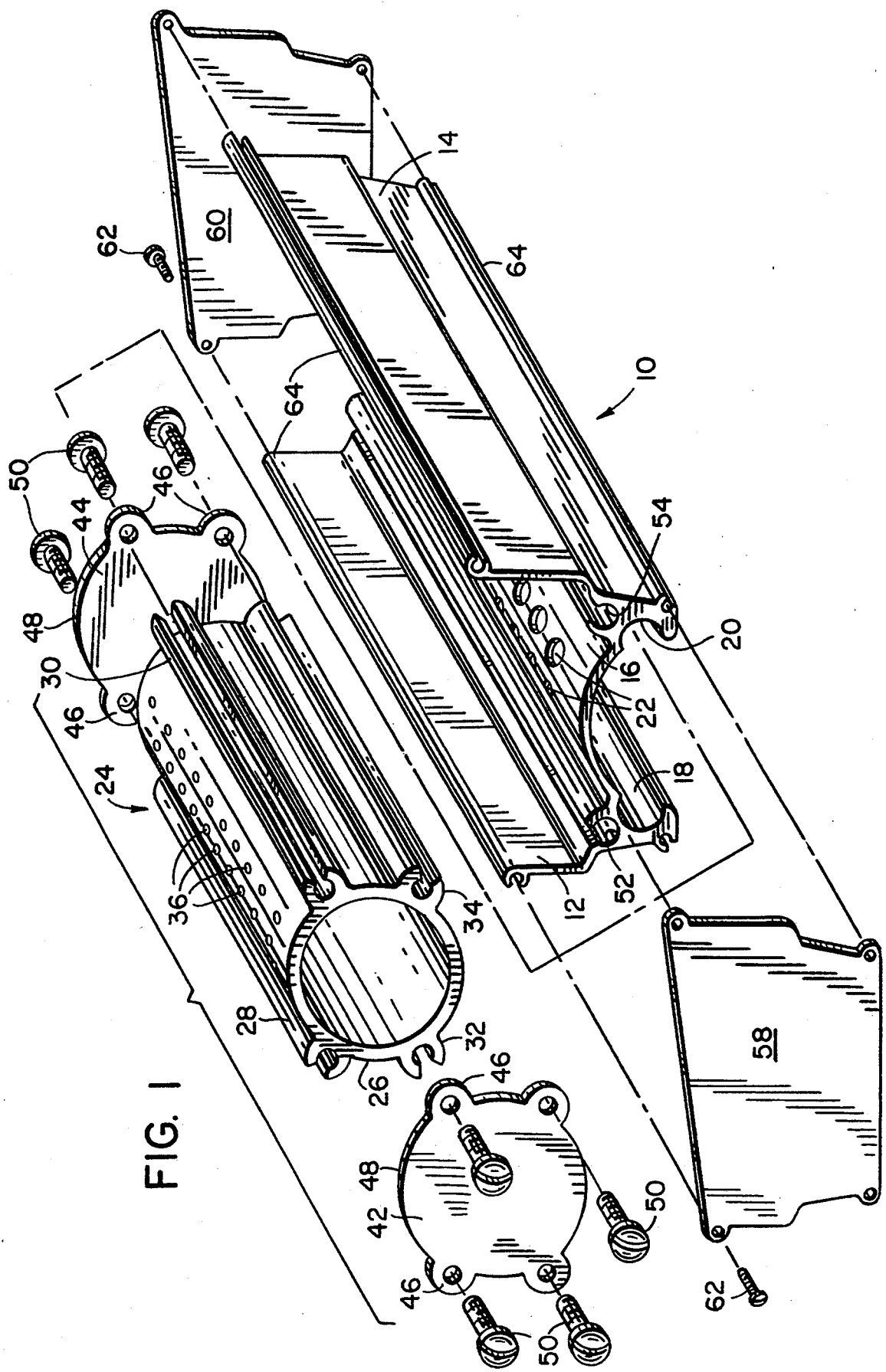
FIG. 1 is an exploded isometric view illustrating the various components of the present invention.

With particular reference to FIG. 1, there is illustrated an extruded reaction canister 10 which may be of a material such as, for example, aluminum. The canister includes sidewalls 12, 14 joined by an inwardly curved floor 16. The bottom edges of the sidewalls extend below the level of the floor 16 and define respective semi-cylindrical channels 18, 20. These channels extend the length of the canister 10 on either side of the floor 16. The floor 16 includes gas inlet passages 22, permitting gas flow into an airbag as will be described.

An extruded inflator chamber 24 is mounted beneath the floor 16 of the reaction canister 10. It houses the gas producing generats and forms the outer shell of the inflator which does not form a part of this invention, and is not further described. The inflator chamber 24 may also be extruded of any desired material such as aluminum. It includes a cylindrical tubular sidewall 26 having tubular projections forming rails 28, 30 bounding its top surface and similar projections 32, 34 bounding its lower surface. The upper surface of the sidewall 26 intermediate the rails 28, 30 defines a plurality of vent holes 36.

Figure 2:
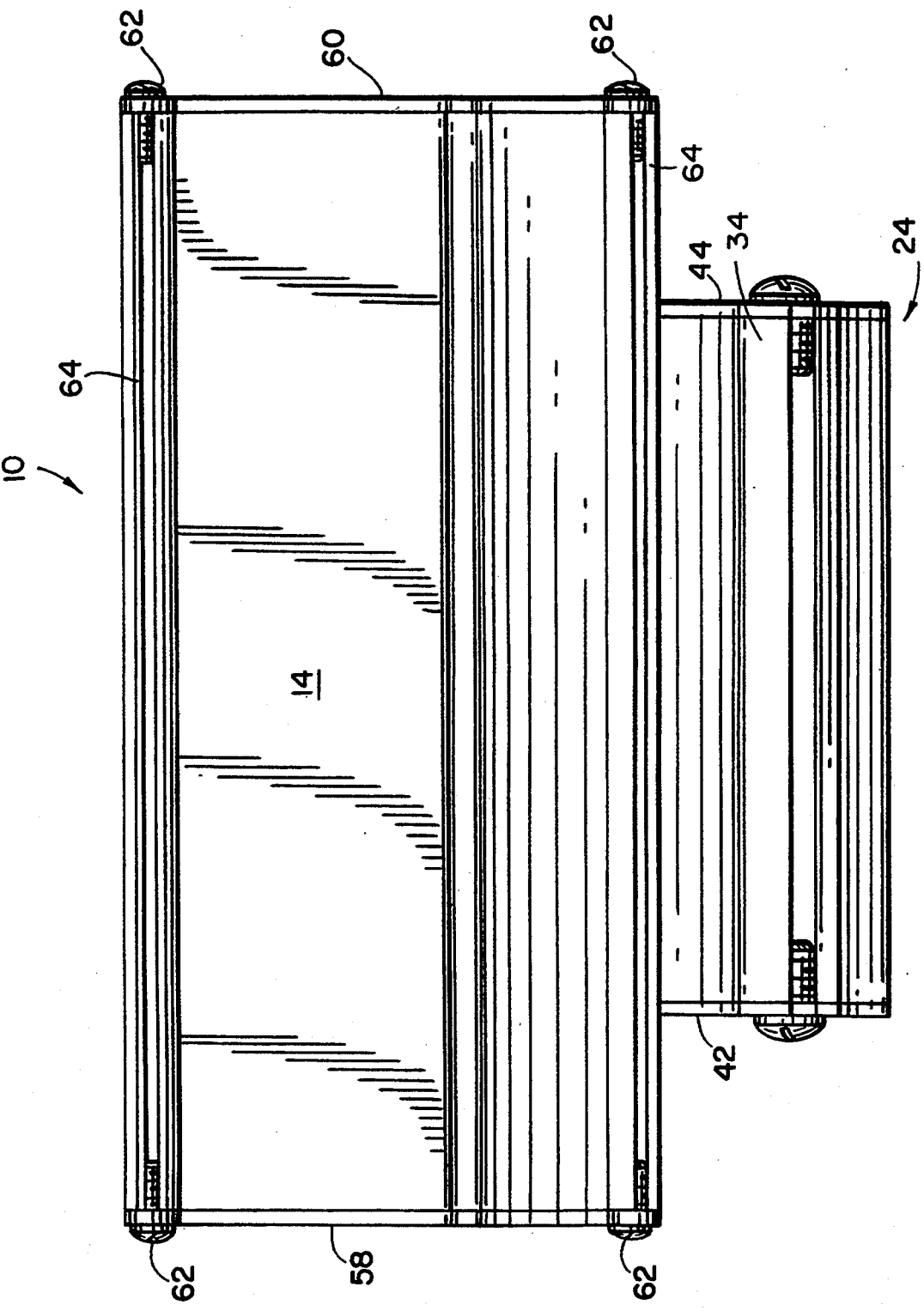
FIG. 2 is an elevational view of a passenger side airbag module in accordance with the present invention.
Figure 3:
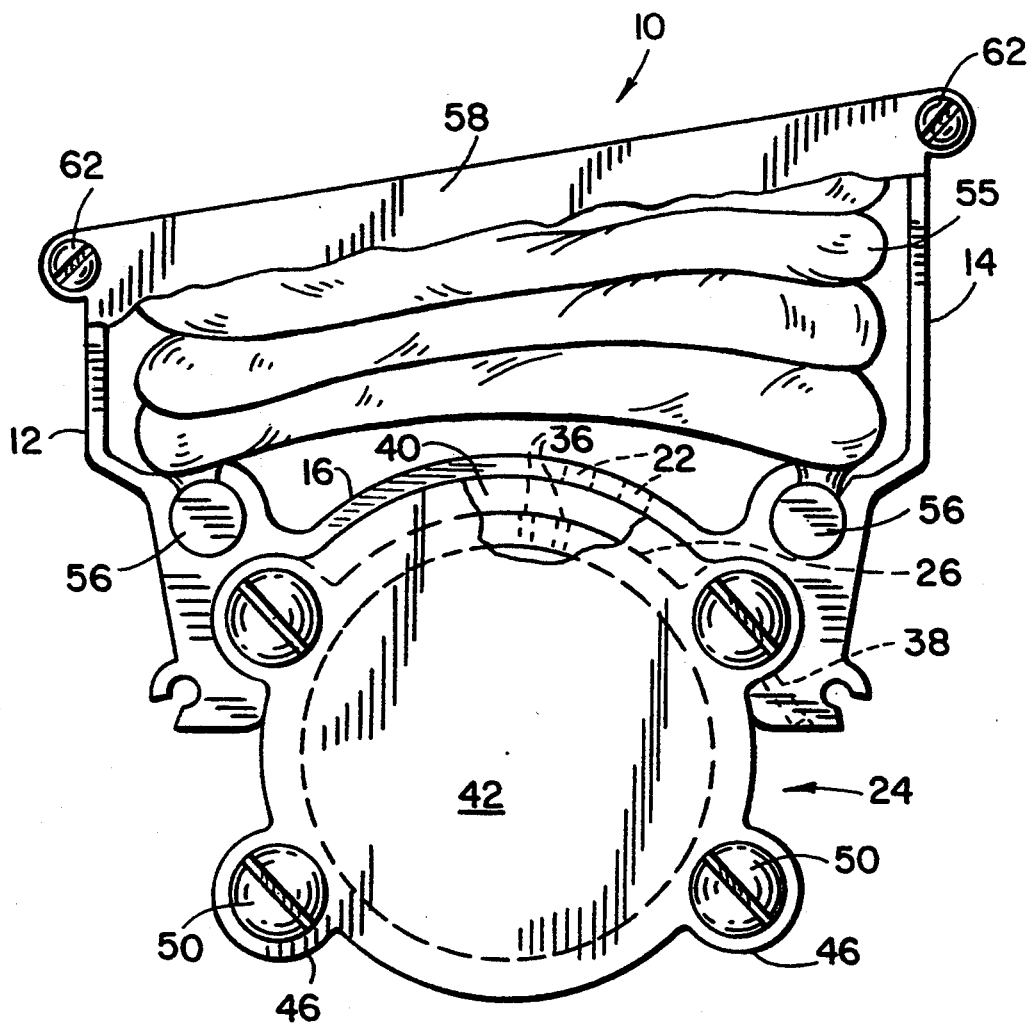
FIG. 3 is a left end view of the module of FIG. 2 with portions of one end plate and one base end plate being broken away to illustrate the internal construction.

The size and position of rails 28, 30 are such that they are readily slid into the channels 18, 20 of the reaction canister 10. The inflator chamber 24 may be positioned in any desired location longitudinally of the reaction canister. It is illustrated in FIG. 2 as being centrally positioned. It may be retained in the desired position by any suitable means such as, for example, a set screw 38 as shown in FIG. 3. The illustrated set screw extends through the reaction canister sidewall 14 and into engagement with the rail 30 on the inflator chamber.

Turning now to FIG. 3, it will be noted that the top surface of the curved sidewall 26 of inflator chamber 24 is spaced below the floor 16 of the reaction canister 10. As a result, a plenum chamber 40 is formed therebetween separating the vents 36 on the inflator chamber from the passages 22 in the canister floor 16. The plenum chamber 40 and the ends of the inflator chamber 24 are closed by a pair of base end plates 42, 44. The base end plates include screw hole projections 46 aligned with the ends of the respective tubular projections 28, 30, 32, 34. The base end plates are asymmetrical in that each includes an upper edge 48 having an enlarged radius such that it engages the bottom surface of the floor 16 to seal the ends of the plenum chamber 40. The base end plates 42, 44 are secured by screws 50 threaded into the tubular projections. In one embodiment, these screws are self-tapping and have heads that break off at a predetermined torque to leave a tamper resistant rivet type head. Suitable provision must be made, of course, for inflator ignition wiring. However, as that does not form a part of this invention it will not be further described.

In addition to the channels 18, 20 formed in the reaction canister below the surface of the floor 16, there are also a pair of channels 52, 54 formed above the surface of the floor 16. These channels may be used to secure opposed edges of the mouth of an airbag 55 by means of tubes or rods 56. Such a construction is disclosed more fully in co-pending application Ser. No. 08/124,713 of Mossi et al. filed Sep. 21, 1993 for "Airbag Module" and assigned to the same assignee as the present invention. The ends of the reaction canister 10 are thereafter closed by end plates 58, 60 secured by screws 62 tapped into the ends of conventional tubular screw preparations 64.

It is believed that the many advantages of this invention will now be apparent to those skilled in the art. It will also be apparent that a number of variations and modifications may be made therein without departing from its spirit and scope. For example, it will be apparent that the rails could be formed at the bottom edges of the canister sidewalls and the channels formed at the top surface of the tubular sidewall of the inflator chamber. Accordingly, the foregoing description is to be construed as illustrative only, rather than limiting. This invention is limited only by the scope of the following claims.

We claim:

1. In an automotive airbag assembly comprising a trough-shaped reaction canister including a floor and first and second sidewalls; first and second endplates closing the ends of said canister; an inflator chamber carried by said canister; means for passing gases generated from within said inflator chamber into said canister; and an airbag within said canister adapted to be inflated by gases from said inflator chamber, the improvement comprising:
   at least one channel integral with, and extending along the length, of one of said canister and inflator chamber; and
   at least one rail integral with, and extending along the length, of the other of said canister and inflator chamber, said rail being insertable into said channel and retained thereby.

2. The improvement of claim 1 wherein said channel is on said canister and said rail defines tubular screw preparations at the ends thereof for securing base ends to said inflator chamber.

3. The improvement of claim 2 wherein said canister carries at least two parallel channels and said inflator chamber carries at least two parallel rails.

4. The improvement of claim 3 wherein one of said canister and inflator chamber is extruded.

5. The improvement of claim 4 wherein both of said canister and inflator chamber are extruded.

6. The improvement of claim 5 wherein said channels are substantially cylindrical recesses formed in said canister on opposite sides of said floor.

7. The improvement of claim 6 wherein said rails are substantially tubular projections slidable within said recesses.

8. An automotive airbag assembly comprising:
   an extruded trough-shaped reaction canister including a floor and first and second sidewalls, each of said sidewalls defining a substantially cylindrical channel extending the length of said canister adjacent said floor;
   first and second endplates closing the ends of said canister;
   an extruded inflator chamber having substantially tubular first and second projections thereon insertable, respectively, into said channels;
   means for passing gases generated from within said inflator chamber into said canister; and
   an airbag within said canister adapted to be inflated by gases from said inflator chamber.

9. The assembly of claim 8 wherein said gas passing means comprises vent holes in said inflator chamber and inlet passages in said canister floor.

10. The assembly of claim 9 wherein said inflator chamber is substantially cylindrical and includes first and second ends closed, respectively, by first and second base ends.

11. The assembly of claim 10 wherein said inflator chamber is spaced from said canister floor to form a plenum chamber intermediate said vent holes and inlet passages, the ends of said plenum chamber being closed by said first and second base ends.

* * * * *